US005627967A

United States Patent [19]

Dauerer et al.

[11] Patent Number: 5,627,967
[45] Date of Patent: May 6, 1997

[54] AUTOMATED GENERATION ON FILE ACCESS CONTROL SYSTEM COMMANDS IN A DATA PROCESSING SYSTEM WITH FRONT END PROCESSING OF A MASTER LIST

[75] Inventors: Norman J. Dauerer, Hopewell Junction; Edward E. Kelley, Wappingers Falls, both of N.Y.

[73] Assignee: International Business Machines Corporation, Armonk, N.Y.

[21] Appl. No.: 456,002

[22] Filed: May 30, 1995

Related U.S. Application Data

[63] Continuation of Ser. No. 754,923, Sep. 24, 1991, abandoned.

[51] Int. Cl.$^6$ ........................................... G06F 17/40
[52] U.S. Cl. ........................ 395/188.01; 395/186
[58] Field of Search ......................... 395/800, 600, 395/186, 187.01, 188.01

[56] References Cited

U.S. PATENT DOCUMENTS

| | | | |
|---|---|---|---|
| 4,104,721 | 8/1978 | Markstein et al. | 395/375 |
| 4,621,321 | 11/1986 | Boebert et al. | 395/600 |
| 4,672,572 | 6/1987 | Alsberg | 380/23 |
| 4,713,753 | 12/1987 | Boebert et al. | 395/425 |
| 4,800,590 | 1/1989 | Vaughn | 380/25 |
| 4,817,050 | 3/1989 | Komatsu et al. | 395/600 |
| 4,821,175 | 4/1989 | Hikita et al. | 395/600 |
| 4,827,423 | 5/1989 | Beasley et al. | 395/650 |
| 4,888,681 | 12/1989 | Barnes et al. | 395/600 |
| 4,891,503 | 1/1990 | Jewell | 235/380 |
| 4,891,785 | 1/1990 | Donohoo | 395/200 |
| 4,951,249 | 8/1990 | McClung et al. | 380/4 |
| 4,958,273 | 9/1990 | Anderson et al. | 395/800 |
| 4,959,774 | 9/1990 | Davis | 395/575 |
| 4,984,272 | 1/1991 | McIlroy et al. | 380/25 |
| 5,228,136 | 7/1993 | Shimizu | 395/425 |
| 5,230,070 | 7/1993 | Liu | 395/425 |

OTHER PUBLICATIONS

Protecting Your VAX Assets, Digital Review Oct. 1, 1990, vol. 7, No. 38, p. 35(4), by Steinberg, J.
Securing the Home Front, Digital Review Oct. 10, 1988, vol. 5, No. 19 p. 111(3) by Steinberg, J.
A New Solution to Coherence Problems in Multicache Systems, IEEE Trans on Computers, vol. C–27, Dec. 1978, pp. 1112–1118.
IBM Disclosure Bulletin, Bamford, R.J. Access Control for a Shared Data Base, Sep. 1980 vol. 23 No. 4.
IBM Technical Disclosure Bulletin, Determining Database Object Authorization, Feb. 1990 vol. 32 No. 9B.

*Primary Examiner*—Eric Coleman
*Attorney, Agent, or Firm*—Whitham, Curtis, Whitham & McGinn; Alison Mortinger

[57] ABSTRACT

A front end is provided for an access controller for controlling access to a shared resource in a data processing system to contain a processed master list, in text form, of users to which access will be granted. The list of users may be edited by a simple editor or word processor. commands to the access controller are generated based upon a comparison of the processed master list and the edited master list. By storing access commands in the front end for the access controller, transparency of the access controller is provided to both users and the system authorization administrator.

24 Claims, 4 Drawing Sheets

RACF MASTER ACCESS CONTROL FILE

| | | | | | | | | | |
|---|---|---|---|---|---|---|---|---|---|
| ABRAHAM | * DEMETRA ABRAHAM | 18Y-3 | > | | | | | 202 | 207 | |
| ABRAITIS | * AM ABRAITIS | 02A-1 | > | 193 | 197 | 198 | 199 | 202 | | 210 |
| ABRAM | * AM ABRAM | 24Q-2 | > | 193 | 197 | 198 | 199 | 202 | 207 |
| ABRAMSN | * N ABRAMS | 33A-1 | > | 193 | 197 | | 199 | 202 | 207 | 210 |
| ACHARD | * LOUIS ACHARD | BRMNT | > | 193 | 197 | 198 | 199 | 202 | 207 | 210 |
| ACHARYA | * SC ACHARYA | 24Q-2 | > | 193 | 197 | 198 | 199 | 202 | 207 |
| ADAMSKI | * JOHN ADAMSKI N&G | 15V-1 N&G | > | 193 | 197 | | 199 | 202 |
| ADDISS | * WD ADDISS | 72B-1 | > | | | | 199 | 202 |
| ADDISSM | * MAUREEN ADDISS | 02H-2 | > | | | 198 | | 202 | 207 |
| ADOURIAN | * K ADOURIAN PE | 16A-1 PE | > | | | | 199 | |
| AFFRONTI | * JA AFFRONTI | 21Y-1 1 | > | 193 | | 198 | 199 | 202 | 207 | 210 |
| AGNELLO | * AGNELLO | 43K-1 1 | > | 193 | 197 | 198 | 199 | 202 | 207 | 210 |
| AIKEN | * E AIKEN (T) | 24Q-2 T | > | 193 | 197 | 198 | 199 | 202 | 207 |

ALIAS FILE FOR ADDITIONAL DATA CONTROL DISKS

| | | | | | | | |
|---|---|---|---|---|---|---|---|
| 193 | 193 | 194 | 213 | 214 | 216 | 217 | 222 |
| 197 | 197 | | | | | | |
| 198 | 198 | | | | | | |
| 199 | 199 | 216 | 217 | | | | |

AUTOMATED GENERATION ON FILE ACCESS CONTROL SYSTEM COMMANDS IN A DATA PROCESSING SYSTEM WITH FRONT END PROCESSING OF A MASTER LIST

This application is a continuation of application Ser. No. 07/754,923, filed Sep. 24, 1991 now abandoned.

BACKGROUND OF THE INVENTION

1. Field of the Invention

The present invention generally relates to file access control systems and, more particularly to a front end system for controlling a file access control system.

2. Description of the Prior Art

In computer systems, control of access to data and program files is often of critical importance in order to maintain file integrity and to obtain security for the information in the files. Control of access to files is particularly important in multi-user systems where a plurality of user terminals are connected to shared or distributed resources, such as memory, and where each terminal is capable of performing as a virtual machine with the entirety of the shared resource resident therein.

Any system for file access control will typically have the capability of regulating access when there is the possibility that a file may be altered so that alterations by one user will not be written over by another user when the file is again stored and to provide each user with only the most recent form of the file. File access systems also will typically have the facility to limit access on a "need to know" basis to limit the files to which a given user may have access or the type of access which can be granted to a user. For example, a user may be denied access to files for which that user has no particular need or, although a particular user may have need for access to information in the file, that user might not have a need to be able to alter the data in that file. As can be readily understood, the reduction of the number of users having the capability of writing to a file can greatly reduce the likelihood that the file may be inadvertently corrupted or that erroneous information will be introduced into the system.

Efficient satisfaction of the above basic requirements of a file access control system necessarily implies some sort of hierarchical division of the shared resource. Such division of the shared resource might be by subject matter, level of sensitivity (e.g. confidentiality) or both at a plurality of levels. Alternatively, the division could be on the basis of individual files. Whatever the hierarchical division might be, it is necessary that each accessible portion of the shared resource include a list of authorized users and the type of access that each may be granted.

For example, in the Resource Access Control Facility (RACF) system, an IBM corporate product program, the shared resource, although possibly physically distributed, can be conceptualized as a master disk and will be so denominated hereinafter. Groups of files therein are divided by subject matter such as individual products, planning, processes, etc. These groups of files form virtual disks, sometimes referred to as mini-disks, which, for purposes of this description are identified by a number. A list of authorized users must exist for each mini-disk.

It should be understood that while the present invention will be described in terms of the RACF system, it is applicable to any system for controlling file access since the basic requirement for any such system is the maintenance of lists of authorized users corresponding to files in the shared resource.

Division of the shared resource in some manner provides a substantial simplification of the access system requirements. For example, it can be readily understood that each list of authorized users of a portion of the resource may potentially contain an entry for each possible user of the system and which can number in the thousands. Therefore, it is not practical to maintain such a list for each file in the system since the size of the list of authorized users might greatly exceed the size of a substantial number of the files. By the same token, each time there is a change in the data concerning any authorized user, each list of authorized users might potentially require updating. On the other hand, the number of lists cannot necessarily be kept small since the division must be made in such a way as to provide the desired degree of selectivity of access since all files in any division corresponding to a single list of authorized users will be accessible to all users contained in that list. Therefore, the number of divisions (e.g. mini-disks) of the shared resource might well number in the hundreds, presenting a major burden when the user lists must be altered.

This burden is compounded by the fact that, for security, passwords or user ID's and other information for validating access must be changed from time to time. Also, the statistical likelihood of a change being required will increase with the number of users. Moreover, the requirement for alteration of multiple lists increases the likelihood of erroneous or obsolete information remaining in a list of authorized users of the mini-disk. In any event, all of these operations must be performed by personnel responsible for management of the database or shared resource, requiring substantial amounts of time and numbers of personnel as well as detailed specialized knowledge of the file access control system. Further, updating the lists of authorized users requires access to the system which may limit use by other users of the system.

It should be noted that granting access to a mini-disk typically requires either logging on to the owning user ID or another user ID that has an "alter capability" to the mini-disk. "Alter capability" can only exist for an administrator user ID if the user ID is located on the same node as the owning user ID or if the administrator's user ID node has a "single system image" with the owning user ID. "Single system image" can be thought of as a network of nodes, each having access to all of the disk space in the network. This arrangement can only be put in place for nodes having a close proximity to one another. After logging onto the appropriate user ID, the administrator is required to input specific (e.g. RACF) commands to grant or remove access for each user whose access must be changed.

The RACF commands can be either against a single user for a mini-disk or against a group of users for a mini-disk. In the event a RACF command is issued against a list of users, the administrator must keep track of the user ID's to be added or deleted. RACF will take the entire list and either add all the user ID's on the list or delete all the user ID's on the list. If an administrator wants to obtain access or delete access for a user ID for several mini-disks, the administrator must issue the appropriate RACF command for each user ID per mini-disk or group of user ID's per mini-disk.

SUMMARY OF THE INVENTION

It is therefore an object of the present invention to provide a front end control for a file access control system which renders the file access control system transparent to an administrator.

It is another object of the present invention to provide a control arrangement for a file access control system which will automatically monitor and update all lists of authorized users.

It is a further object of the present invention to provide for updating the lists of authorized users without requiring immediate access to the system.

It is another further object of the invention to eliminate the need for separate lists for granting access and/or for removing access or for having to indicate on a single list whether a user ID is to be granted access or to have access removed.

It is yet another object of the present invention to achieve the above-listed objects regardless of the complexity of division of the shared resource which may be established or desired.

In order to achieve the above and other objects of the invention, a file access controller front end for a data processing system is provided including apparatus and method for detecting invalid and duplicate access authorizations, reporting and resolving any detected invalid or duplicate access authorizations, and denying access to said data processing system responsive to detection of any said invalid or duplicate access authorizations.

In accordance with another aspect of the invention, a file access controller front end for an access controller of a data processing system is provided including apparatus for storing a processed master list of authorized users corresponding to data in user/access lists in said data processing system in text form, to which the data processing system will grant access, providing editing of said text of said processed master list to form an edited master list, and updating said user/access lists and said processed master list to conform to said edited master list.

In accordance with a further aspect of the invention, an access control system for a data processing system, which has at least a portion of a memory arranged as a plurality of mini-disks, is provided including apparatus and method for creating a master list of authorized users of the data processing system, creating a plurality of lists of authorized users for the plurality of mini-disks, at least one list of the plurality of lists corresponding to each mini-disk, from said master list, and creating a processed master list from the plurality of lists of authorized users of the mini-disks.

In accordance with a yet another aspect of the invention, a method of altering access authorization of a data processing system which includes at least a portion of memory arranged as a plurality of mini-disks is provided including the steps of editing a master list of authorized users, creating a list of authorized users for at least one mini-disk, and storing the list of authorized users for at least one mini-disk.

BRIEF DESCRIPTION OF THE DRAWINGS

The foregoing and other objects, aspects and advantages will be better understood from the following detailed description of a preferred embodiment of the invention with reference to the drawings, in which:

FIGS. 4a and 4b are examples of text data entries in the master list and alias list, respectively, in accordance with the invention.

DETAILED DESCRIPTION OF A PREFERRED EMBODIMENT OF THE INVENTION

Figure 1:
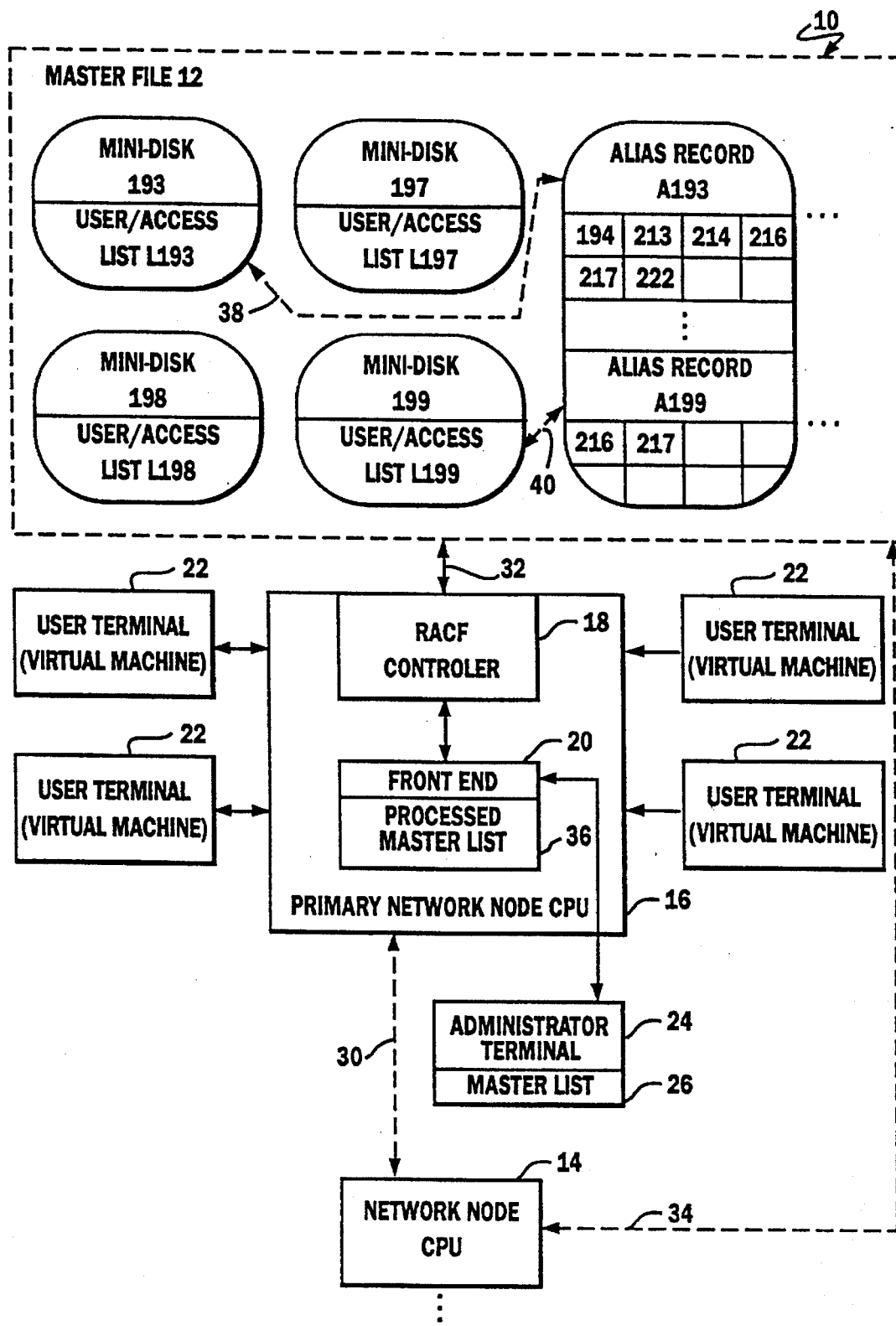
FIG. 1 is a schematic diagram of an exemplary system including a file access controller indicating the use therein of the present invention.

Referring now to the drawings, and more particularly to FIG. 1, there is shown an exemplary system 10 in schematic form indicating the cooperation of the present invention therewith. The overall system includes a master file 12, a plurality of network nodes 14 and a primary network node 16. The primary network node 16 is distinguished from other network nodes 14 primarily by its association with an administrator terminal 24 which may be a dedicated terminal for use by the system administrator but more recently has been constituted by any user terminal 22 on which the administrator has entered his own ID corresponding to his function as system administrator. However, for purposes of this description, it may be useful to conceptualize the administrator terminal as at least a distinct, identifiable terminal. Each of the network nodes 14, including the primary network node 16, will be associated with a plurality of user terminals 22, each operating as a virtual machine with respect to access to master file 12. Access to the master file 12 by the Network nodes can be either through the primary network node, as illustrated by dashed line 30 and link 32, or directly, as illustrated by dashed line 34.

In extensive networks such as system 10, which is exemplary of the Intersite Line Comparison System (ILC), it is common to regulate access to selected portions of the master file 12 as to each operator under control of some file access control system such as the Resource Access Control Facility (RACF) 18 shown. In the prior art, the RACF or other file access control system is under the control and supervision of an authorization administrator. The authorization administrator must access the system in order to exercise control over the RACF and must have detailed knowledge of the RACF.

It should be noted that the ILC system is the subject of U.S. patent application Ser. No. 07/755,036, filed Sep. 4, 1991, now U.S. Pat. No. 5,475,833, issued Dec. 12, 1995 entitled DATABASE SYSTEM FOR INTERSITE LINE COMPARISON, by N. J. Dauerer and E. E. Kelley, filed concurrently herewith and assigned to the assignee of the present invention, the disclosure of which is hereby fully incorporated by reference herein. In the ILC system, which is used to compare production data from widely separated manufacturing sites, there is a need for near-simultaneous access by numerous users to data which is most efficiently stored on a plurality of mini-disks. Therefore, the burden of separate logging on operations and RACF authorizations by the administrator for a number of users to a large number of mini-disks is particularly great.

In contrast, the present invention, implemented as a front end to the RACF, contains the knowledge of the RACF and can render it transparent to administrators while eliminating the need for detailed knowledge of the RACF by the authorization administrator. This is done by using the front end implementation according to the invention to actually perform the manipulations of the RACF or other file access control system. In other words, the invention is used to generate the actual commands needed to properly manipulate the file access system. Doing so in this fashion allows additional utilities to be implemented which are particularly advantageous, as will be discussed below.

In essence, since the invention at the front end of the RACF is able to operate the file access control system, the data concerning authorized user access can be reduced to a single, editable file which the authorization administrator can manipulate with a simple editor program such as word processor. Further, the single, editable file, referred to hereinafter as the master list 26, can be kept as a local file. Access to the system to update mini-disk access lists and an existing processed master list 36, reflecting the mini-disk access lists, to correspond to an updated master list 26 can be deferred until such time as access by a user is actually required. For instance, the updating of the master list within the system can be carried out on a regular schedule when user traffic is low and thus avoid conflicts with needs for the system by users. Of course, if the authorization administrator wishes to grant immediate authorization for use of a file, the system must still be accessed. However, even in this case, since the updating is automated by the invention, the system burden is minimized. Once a user has thus been granted access to the system, that user can enter the system and gain access to files as desired, to the limit of the access authorized.

Figure 2:
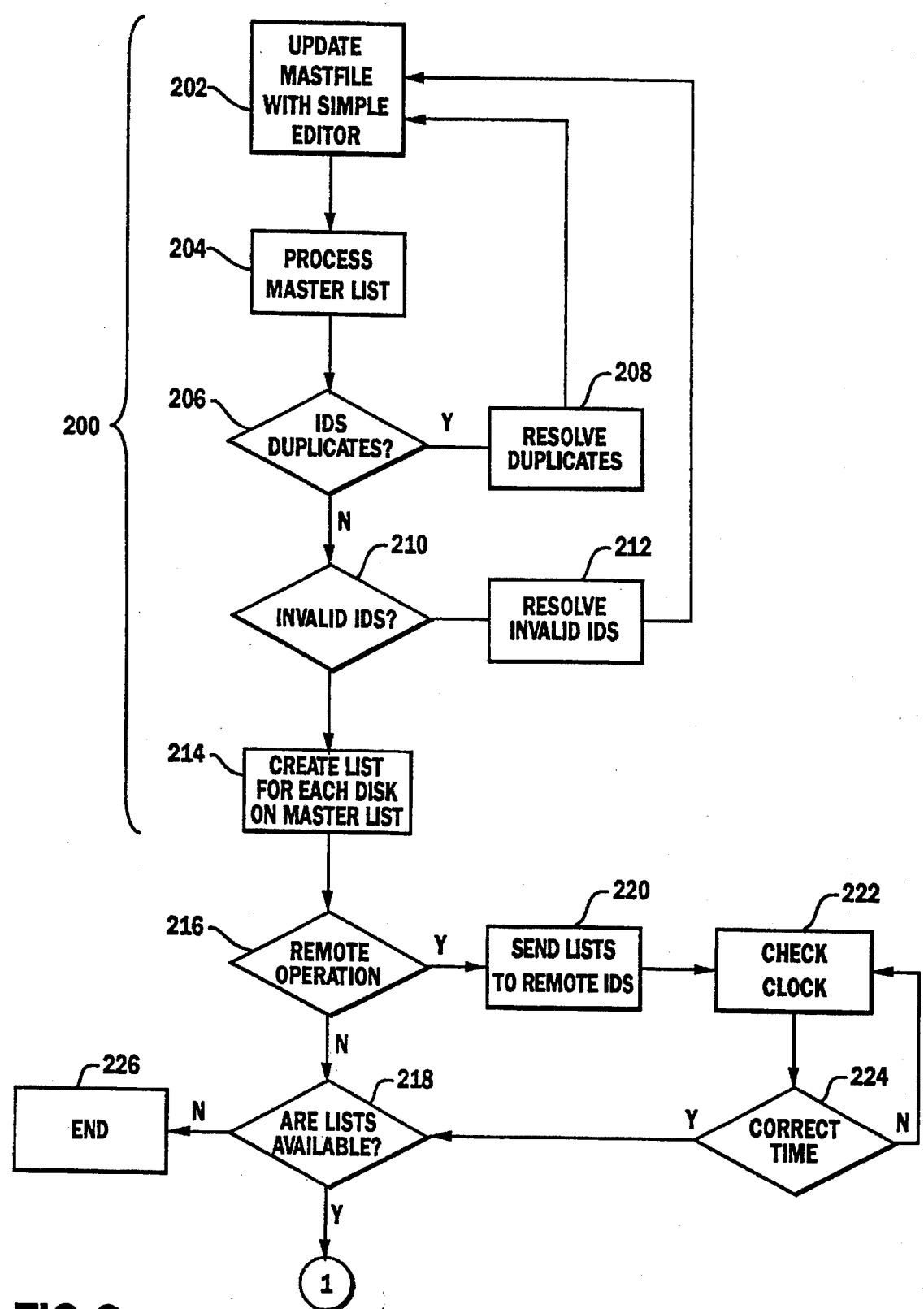
FIGS. 2 and 3 are a flow chart indicating the operation of the present invention.

The operation of the invention will now be described with reference to FIGS. 2 and 3. For purposes of this discussion, it will be assumed that changes are to be performed by the authorization administrator since the system update steps 200, bracketed in FIG. 2 need only be done when the authorization administrator changes some access data. This update operation 202 is done locally to the administrator terminal 24 and stored as a local file at 26. Thereafter, at a convenient time, the master list is processed at 204. The processing of the master list causes the primary network node 16 to first identify all duplicate user identifications. Apparent duplicate user identifications are returned (e.g. reported and displayed or printed out) to the administrator terminal 24 where they can be deleted or otherwise resolved 208 by the system administrator. This feature is important to efficient user authorization since it prevents plural passwords from existing for a single user and which might accumulate only partial authorizations for access to files. The invention does not allow further access to the system until all duplicate user identifications are resolved.

Only when no duplicate user identifications are detected, the invention checks for invalid user identifications. These invalid user identifications might come into existence when an authorization has been terminated in any one of several ways. For instance, a command altering access may be mistyped and not deleted or a user may physically move from one node of the system to another where another user ID may be established. Also, systems such as RACF may continue to keep a user ID as one having previously had access even after the user ID is otherwise removed from the system.

If a user identification is to be invalidated but not properly carried out, the user ID could be carried in the system for extended periods of time, possibly months or years, and presents a substantial security risk. The manner in which invalid user identifications are found is not particularly important to the practice of the invention but could be done, for example, by comparison of access authorization or password change dates, user ID invalidation lists, etc. or a plurality of such user data items. The important fact, from a practical point of view is that any suspected invalid user ID will be reported to the authorization administrator each time the master list is updated and resolution of all suspected invalid user ID's will be required before access is granted to the system. In a preferred form of the invention, however, a transaction is individually carried out against all user ID's in master list 26. Specifically, it is desired to remove invalid user ID's from the master list which could, for example, occur when a user ID is invalidated by some transaction in the system which is not reported to the system administrator and, hence, not reflected in a deletion from the master list 26.

Therefore, any invalid user ID which has not been removed from the master list may still be listed in the RACF list of authorized users for a mini-disk. In this case, if a new user ID were to be issued that had the same name as the previously deleted user ID, it would, undesirably, have the same mini-disk access as the previous user. Thus, the preferred form of the invention determines if any user ID's in the master list 26 are invalidated or otherwise not present in the system as reflected in processed master list 36. It should be noted that these transactions constituting this operation remain local to the primary network node and system access is not required.

When no invalid user ID's are detected, the primary network node stores the new master list as processed master list 36 and creates disk lists of users for each mini-disk contained in the master list and communicates these lists to the master file 12 where they are stored in files (e.g. L193, L198) corresponding to the associated mini-disk. It is important to note that all that is required at the primary network node 16 is that the files be sent to processors which hold or own the mini-disks to which access authorization is to be changed. This may or may not involve a remote operation. Therefore, the system administrator can perform changes in access authorization from any terminal connected to the system in one of two ways.

A remote operation means that a master file and newly created mini-disk files (e.g. mini-disk user access lists) are sent to the user ID that controls the mini-disks, such as a user ID assigned to the administrator on a remote system node. If the administrator is on a different node of the system, this will always be the case. If the administrator is on the same node as the files, then the files will still be sent unless the administrator has "alter capability". If there is "alter capability" provided for the administrator on his user ID, then the administrator may elect to invoke the authorization programs directly on his own user ID from any node in the system.

If a remote operation, as defined above, is required at 216, the new lists are sent to a remote ID where they are stored until a predetermined time occurs 222, 224 and processing resumes at 218 with a check of the availability of both old and new lists as will be discussed below in regard to operation 324. If such a remote operation is not required, either because of the locality of the files or the "alter capability" of the administrator's ID, the operation may immediately proceed.

This option is of substantial operational importance in regard to the number of changes which may be desired and maximum utilization of the system. For instance, if the changes are numerous, substantial processing time may be required and the administrator would probably elect to merely send the lists to an owning ID, whether local, remote or both, to be held until list processing by the invention, illustrated in FIG. 3, is conducted under off-peak network traffic conditions. On the other hand, if the number of lists affected is small, it is a great convenience to the administrator and the user in question that the administrator is able to send and cause processing of the new user/access lists (e.g. mini-disk lists) from a single identification from any terminal connected to the system.

It should be noted at this point that all of the above steps of the operation of the invention are performed and all duplicate and invalid ID's are flagged and resolved before communicating with the RACF or other access control system. This is perhaps the most time consuming portion of the operation and requires maximum involvement of the authorization administrator. The fact that this portion of the process is accomplished without system access maximizes the availability of the system to users. This local resolution of duplicate and invalid ID's can also be separated in time from the updating of the mini-disk lists, allowing the involvement of the administrator to occur at a convenient time.

Whether or not a remote procedure call will be required, both branches return to 218 which determines if the user\access lists are available. Since these lists must be available for proper operation of the RACF or other file access control system, a lack of the availability of these both old and new mini-disk lists represents a processing option which is reported and the process branches to an end 226. This would occur, for instance, where a new list was sent where no list previously existed, as in the formation of a new mini-disk. In this case, the new list is effectively compared, at 306 of FIG. 3, with a null list and all entries in the new list represent changes. The other circumstance reflected at 324 is when only the old list is available, as would occur when no changes were required and no new list was sent. In this case, it is appropriate to immediately branch to end 326.

Before proceeding with this discussion of the operation of the invention, the concept of alias files will be discussed. In order to limit the number of lists which must be kept, it is often desirable to provide a hierarchy within the data structure. The invention accommodates this possibility by the use of alias files. As shown in FIG. 1, access authorization for a plurality of files within a mini-disk can be associated with a single access authorization. Thus, when a user is granted access to files grouped with, say, access code 193, that user will be listed in the user/access list L193. User access list 193, for example, refers to several other mini-disks which will have access granted or revoked for the same users which are on the 193 mini-disk list.

Since a large number of files or groups of files can be specified by a single access authorization in this manner, the number of the user/access lists directly reflected in processed master list 36 may be kept to a minimum. In other words, the use of alias files eliminates the need to keep a list of all file access authorizations in the master list and permits access to be granted on the basis of groups of files or records maintained in the alias records A193, A199, etc. This technique of using alias lists can be implemented at plural levels of a relationship within a database or master file, as needed, to provide any desired degree of selectivity of access authorization between users with a minimal requirement for memory to store the user/access lists. The alias file thus decreases the size of the master list and simplifies the maintenance of the master list.

Figure 3:
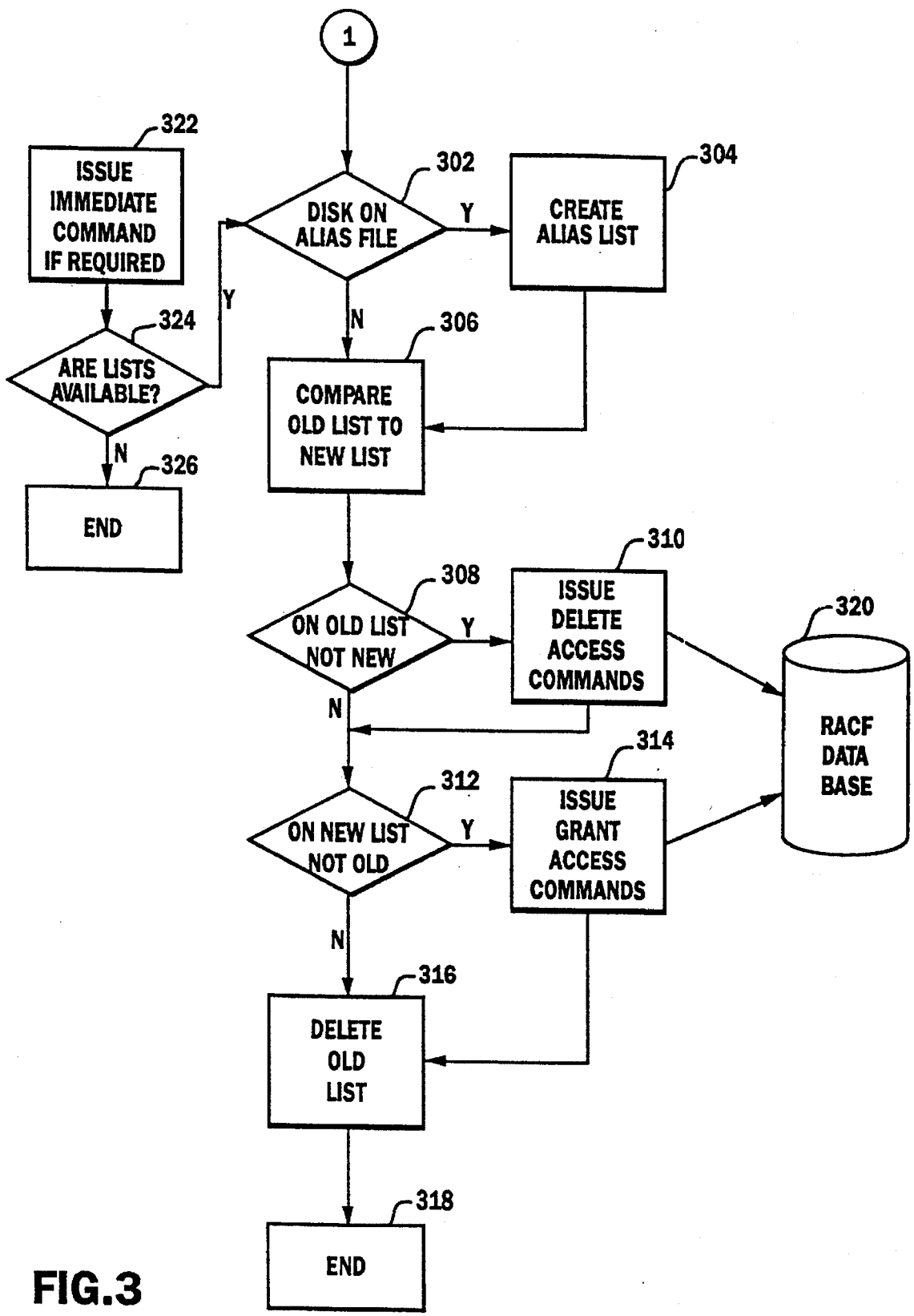

Referring now to FIG. 3, if user/access lists are available, the process continues by determining whether or not the user/access list is in the alias file at 302. For every mini-disk in the alias file, a duplicate access list is created.

The new list is checked against the previous list at 306. It should be noted that the level at which the list exists is not important. Whenever the list is reached, the comparison is made, whether the list is a user access list or an alias record.

It is an extremely important aspect of the present invention that the access information operated upon by the invention is, in every case, merely a list which can be created and edited freely with the simplest of editors or word processor programs. The operations carried out by the invention are also simple and rapidly executable much in the manner of a spell-check routine or a word search.

Any differences between the old and new lists detected at 306 are then categorized as to the type of change at 308 and 312. If a user ID is on the old list but not the new list, a delete command is issued at 310 to the RACF controller 18 and the master file 12, illustrated collectively as 320 in FIG. 3. Similarly, if a user ID is on the new list but not the old list, a grant access command is issued. When all differences between new and old lists have caused either a delete or grant access command, update of the disk lists will be complete. The old list is then deleted at 316. The new list becomes the old list and the operation ends.

The above description of the operation of the access controller front end, according to the invention should be considered to be the normal mode of operation of the invention and it should be understood that the operation will accomplish a mass-update of all user/access lists and alias lists in which the access data has been altered. It should be noted, however, that it is not necessary to perform the entirety of this operation to alter access authorization.

Specifically, an immediate change command can be issued so that after the files have been created and/or sent to the owning user ID (e.g. the user ID which has authority to grant access to particular mini-disks), the authorization programs may be immediately invoked rather than waiting for the clock to invoke changes at a desired off-peak time. The immediate change command, as issued by the administrator, need not even characterize the nature of the change (e.g. as a delete or a grant access) and is thus exemplary of how the invention stores the nature of the access control system and relieves the authorization administrator of any need to have detailed knowledge of the access control system.

Once the authorization administrator has edited the master list 26 and issued an immediate change command at 322, a check is made to determine if the disk lists involved are available and, as before, branches to end 326 under the error condition of the unavailability of the lists. If the appropriate lists are available, the disk lists are updated beginning at step 302, as described above.

An important feature of the invention, as illustrated in FIG. 1, is the fact that the access controller front end of the invention provides for storage of the master list at two locations. The processed master list 36 which indicates the access requests to which the RACF will respond is stored in the primary network node 16. The "current" master list 26 is stored at the authorization administrator terminal 24. These lists will only differ by the changes made since the last system update. Therefore, if the authorization administrator terminal should lose the master list 26, due to some malfunction, the processed master list 36 can be obtained from the primary network node and can be edited to recreate the "current" master list. Should the processed master list be lost at the primary network node, it can, similarly, be regenerated from the disk lists in the master file 12. Thus it can be seen that the access controller front end provides several levels of redundancy to assist in rapid error recovery. Also, the existence of the master file 26 at the administrator terminal 24 and the processed master file 36 at the primary network node 16 allows the authorization administrator to have sole access to these files under his own ID for purposes of security and to obtain access to these files without the need for system access. By the same token, security is improved since access to these files from the system can be more readily prevented.

Examples of the master list and alias file are shown in FIGS. 4a and 4b, respectively. It is readily seen that the master list is merely a tabulation of names, user ID's and mini-disk numbers. Once a user logs onto the system, these authorized accesses will be processed, either immediately or under control of the application being run by the user. As indicated by dashed lines 38 and 40 in FIG. 1, if a number in the master list appears in the left-hand column of the alias file, the files included in the second through Nth columns of the alias file will also be granted access, when required.

The invention automatically performs the operations necessary to produce file access commands to the RACF or other file access control system either under application or operator (e.g. a user or the authorization administrator) control much in the manner in which a batch file is executed. That is, when a given command is issued by either the application or the operator one or more predetermined commands are issued to the RACF. These particular commands are specific to the file access control system used and will be evident to those skilled in the art. By this technique of storing these commands within the front end according to the invention, the file access control system is made entirely transparent not only to the user and authorization administrator but to the applications being run, as well. Therefore neither the user nor the authorization administrator need have detailed knowledge of the file access control system and all accesses which are required by the application may be performed automatically as needed.

It should also be noted that since the invention is implemented as a front end for the RACF or other file access system, the remainder of the system remains completely unaffected by the inclusion of the invention in the system. Therefore, the invention does not impose any constraints on any application run on the system and is compatible with all caching systems and predictive and arbitration arrangements for controlling access to the master file or shared resource and other arrangements for maximizing system speed and response time or minimizing network traffic.

In view of the foregoing detailed description of the invention, it is readily seen that the access controller front end, according to the invention, provides access controller transparency to both the user and the authorization administrator, automatically monitors and updates all lists of authorized users without the need for immediate access to the system, carries out resolution of duplicate and invalid authorizations without system access and allows the issuance of immediate access authorization, if necessary. All of the foregoing are accomplished by the invention without the need for imposition of any architectural or operational constraint upon the system.

While the invention has been described in terms of a single preferred embodiment, those skilled in the art will recognize that the invention can be practiced with modification within the spirit and scope of the appended claims.

Having thus described our invention, what we claim as new and desire to secure by Letters Patent is as follows:

1. A file access controller front end for an access controller of data processing system, said data processing system having a file access controller including a master file, said master file of said data processing system having a plurality of user/access lists, said file access controller front end being connected to said data processing system and including means for storing a processed master list of authorized users corresponding to data in said user/access lists of said master file of said data processing system, said processed master list being stored seperately from said master file in text form and identifying the authorized users to which said data processing system will grant access, means for detecting invalid and duplicate user/access authorizations in said processed master list, means for editing said text of said processed master list to form an edited master list with said invalid and duplicated user/access authorizations remove therefrom, and means for accessing said file access controller only subsequent to said editing of said text updating said user/access list of said file access controller of said data processing system and said processed master list in response to said edited master list to provide new user/access lists and new processed master list which conform to said edited master list.

2. An access controller front end as recited in claim 1, further including means for generating at least one new user/access list corresponding to said edited master list, and means for automatically generating commands for said access controller based on a comparison of a previous user/access list and said new user/access list.

3. An access controller front end as recited in claim 1, further including means for specifying and storing at least one alias file corresponding to an authorized user identification in at least one of said processed master list and said edited master list, and means for granting access to at least one file in said master file corresponding to said alias file in response to said authorized user identification.

4. An access controller front end as recited in claim 3, further including means for generating at least one new user/access list and at least one new alias file corresponding to at least one of said edited master list and said stored alias file, and means for automatically generating commands for said access controller based on a comparison of at least one previous user/access list with said new user/access list and said new alias file with said stored alias file.

5. A file access control system for a data processing system, said data processing system having at least a portion of a memory arranged as a plurality of mini-disks, each said mini-disk including a list of authorized users, said access control system including means for creating a master list of authorized users of said data processing system, means for creating a plurality of lists of authorized users for said plurality of mini-disks, at least one list of said plurality of lists corresponding to each mini-disk, from said master list, means for creating a processed master list from said plurality of lists of authorized users of said mini-disks, means for validating and editing said processed master list to form an edited master list, and means for accessing said file access controller only subsequent to said validating and editing of said text updating a list of authorized users of a mini-disk said data processing system and said processed master list in response to said edited master list to provide new lists of authorized users and a new processed master list which conform to said edited master list.

6. A system as recited in claim 5, wherein said master list comprises a matrix of authorized user identifications and mini-disk identifications.

7. A method of altering access authorization of a data processing system which includes a file access controller and at least a portion of memory arranged as a plurality of mini-disks, each said mini-disk including a list of authorized users, said method including the steps of validating and editing a master list of authorized users to form an edited master list, creating a processed master list of authorized users for at least one mini-disk from said edited master list, storing said list of authorized users for at least one mini-disk, and accessing said file access controller only subsequent to said validating and editing of said list of authorized users of a mini-disk of said data processing system and said creation of said processed master list in response to said edited master list to provide a new list of authorized users and a new processed master list which conform to said edited master list.

8. A method as recited in claim 7, wherein said step of storing said list of authorized users for at least one mini-disk is performed in response to a further step of entering a predetermined identification code at any terminal of said data processing system.

9. A method as recited in claim 7, wherein said step of storing said list of authorized users for at least one mini-disk includes a further step of comparing said list of authorized users for said at least one mini-disk with a previously stored list, and generating access authorization commands for granting or revoking access authorization is response to said comparing step.

10. A method as recited in claim 7, including the further step of generating a processed master list from said list of authorized users for at least one mini-disk.

11. A method of file access control for a data processing system including a file access controller and a master file, said master file of said data processing system having plurality of user/access lists, including the steps of storing a processed master list of authorized users corresponding to data in said user/access lists of said data processing system, said processed master list being stored in said file access controller separately from said master file in text form and identifying the authorized users to which said data processing system will grant access, detecting invalid and duplicate user/access authorizations in said processed master list, editing said text of said processed master list to form an edited master list with said invalid and duplicate user/access authorizations removed therefrom, and accessing said file access controller only subsequent to said editing step, updating said user/access lists of said file access controller of said data processing system and said processed master list in response to said edited master list to provide new user/access lists and a new processed master list which conform to said edited master list.

12. A method as recited in claim 11, including the further steps of generating at least one new user/access list corresponding to said edited master list, and automatically generating commands for said access controller based on a comparison of a previous user/access list and said new user/access list.

13. A method as recited in claim 11, including the further steps of specifying and storing at least one alias file corresponding to an authorized user identification in at least one of said processed master list and said edited master list, and granting access to at least one file in said master file corresponding to said alias file in response to said authorized user identification.

14. A method as recited in claim 13, including the further steps of generating at least one new user/access list and at least one new alias file corresponding to at least one of said edited master list and said stored alias file, and automatically generating commands for said access controller based on a comparison of at least one previous user/access list with said new user/access list and said new alias file with said stored alias file.

15. A method as recited in claim 11, wherein said processed master list is stored at a primary system node, and said edited master list is stored at a remote system node.

16. A method as recited in claim 15, wherein said new user/access lists are compared with previous user/access lists at said remote system node.

17. A method of access control for a data processing system, said data processing system having at least a portion of a memory arranged as a plurality of mini-disks and including a file access controller, said method including the steps of creating a master list of authorized users of said data processing system, creating a plurality of lists of authorized users for said plurality of mini-disks, at least one list of sad plurality of lists corresponding to each mini-disk, from said master list, creating a processed master list from said plurality of lists of authorized users of said mini-disks validating and editing said processed master list to form an edited master list, and accessing said file access controller only subsequent to said validating and editing of said list of authorized users of a mini-disk said data processing system and said creating of said processed master list in response to said edited master list to provide new lists of authorized users and a new processed master list which conform to said edited master list.

18. A system as recited in claim 17, wherein said master list comprises a matrix of authorized user identifications and mini-disk identifications.

19. An access control system for a data processing system having at least a portion of a memory arranged as a master file, said master file of said data processing system having a plurality of mini-disks and a plurality of user/access lists corresponding to respective ones of the mini-disks, said access control system including means for storing a processed master list of authorized users corresponding to data in said user/access lists of said master file of said data processing system, said processed master list being stored separately from said master file in text form and identifying the authorized users to which said data processing system will grant access, means for detecting invalid and duplicate user/access authorizations in said processed master list, means for editing said text of said processed master list to form an edited master list with said invalid and duplicate user/access authorizations removed therefrom to form an edited master list, and means for accessing said file access controller only subsequent to editing of said text of said processed master list, updating said user/access lists of said data processing system and said processed master list in response to said edited master list to provide new user/access lists and a new processed master list which conform to said edited master list.

20. An access control system as recited in claim 19, wherein said processed master list is stored at a primary system node, and said edited master list is stored at a remote system node.

21. An access control system as recited in claim 20, wherein said new user/access lists are compared with previous user/access lists at said remote system node.

22. A method of access control for a data processing system including a file access controller and at least a portion of a memory arranged as a master file, said master file of said data processing system having a plurality of mini-disks and a plurality of user/access lists corresponding to the mini-disks, including the steps of storing a processed master list of authorized users corresponding to data in said user/access lists of said master file of said data processing system, said processed master list being stored in said file access controller separately from said master file in text form and identifying the authorized users to which said data processing system will grant access, detecting invalid and duplicate user/access authorizations in said processed master list, editing said text of said processed master list to form an edited master list with said invalid and duplicate user/access authorizations removed therefrom, and accessing said file access controller only subsequent to editing of said text, updating said user/access lists of said data processing system and said processed master list in response to said edited master list to provide new user/access lists and a new processed master list which conform to said edited master list.

23. A method as recited in claim 22, wherein said processed master list is stored at a primary system node, and said edited master list is stored at a remote system node.

24. A method as recited in claim 23, wherein said new user/access lists are compared with previous user/access lists at said remote system node.

\* \* \* \* \*